(12) United States Patent
Casula

(10) Patent No.: US 9,426,494 B2
(45) Date of Patent: Aug. 23, 2016

(54) SYSTEMS AND METHODS WITH EARLY VARIANCE MEASURE USED TO OPTIMIZE VIDEO ENCODING

(75) Inventor: Michele Casula, Bradley Stoke (GB)

(73) Assignee: ZiiLABS Inc., Ltd., Hamilton (BM)

( * ) Notice: Subject to any disclaimer, the term of this patent is extended or adjusted under 35 U.S.C. 154(b) by 454 days.

(21) Appl. No.: 13/274,044

(22) Filed: Oct. 14, 2011

(65) Prior Publication Data

US 2013/0022102 A1    Jan. 24, 2013

Related U.S. Application Data

(60) Provisional application No. 61/508,907, filed on Jul. 18, 2011.

(51) Int. Cl.

| | |
|---|---|
| *H04N 19/124* | (2014.01) |
| *H04N 19/87* | (2014.01) |
| *H04N 19/176* | (2014.01) |
| *H04N 19/172* | (2014.01) |
| *H04N 19/11* | (2014.01) |
| *H04N 19/109* | (2014.01) |
| *H04N 19/14* | (2014.01) |
| *H04N 19/152* | (2014.01) |

(52) U.S. Cl.
CPC ............ *H04N 19/87* (2014.11); *H04N 19/109* (2014.11); *H04N 19/11* (2014.11); *H04N 19/124* (2014.11); *H04N 19/14* (2014.11); *H04N 19/152* (2014.11); *H04N 19/172* (2014.11); *H04N 19/176* (2014.11)

(58) Field of Classification Search
CPC ................. H04N 19/00036; H04N 19/00042; H04N 19/00145; H04N 19/00175; H04N 19/00278; H04N 19/00781
See application file for complete search history.

(56) References Cited

U.S. PATENT DOCUMENTS

| | | | | |
|---|---|---|---|---|
| 2004/0252758 | A1* | 12/2004 | Katsavounidis | H04N 19/52 375/240.2 |
| 2007/0171974 | A1* | 7/2007 | Baik | H04N 19/51 375/240.12 |
| 2011/0032983 | A1* | 2/2011 | Sezer | H04N 19/147 375/240.02 |
| 2012/0039386 | A1* | 2/2012 | Srinivasamurthy | H04N 19/00096 375/240.03 |

FOREIGN PATENT DOCUMENTS

| | | | | |
|---|---|---|---|---|
| WO | WO 2011/005063 A2 * | 1/2011 | | H04N 7/34 |
| WO | WO 2011005063 A2 * | 1/2011 | | H04N 19/197 |

OTHER PUBLICATIONS

Kim, Jongho and Jechang Jeong, "Fast intra-mode decision in H.264 video coding using simple directional masks", 2005, SPIE, Proc. of SPIE vol. 5960.*

(Continued)

*Primary Examiner* — William C Vaughn, Jr.
*Assistant Examiner* — Stuart Bennett
(74) *Attorney, Agent, or Firm* — Merchant & Gould, P.C.

(57) ABSTRACT

Methods and systems for video encoding, using a variance measure to directly effect efficiencies and optimizations at various stages of video encoding to improve compute cycle, power, heat and bandwidth efficiency and decoded picture quality and decrease the bit length of encoded frames. Download rate and decoding efficiency are also improved as a result of the improvements realized at the encoder.

19 Claims, 18 Drawing Sheets

(56) References Cited

OTHER PUBLICATIONS

Kim, Jongho and Jechang Jeong, "Fast intra-mode decision in H.264 video coding using simple directional masks", Proceedings of SPIE, vol. 5960, SPIE, 2005.*

Kim, Jongho and Jechang Jeong, "Fast intra-mode decision in H.264 video coding using simple directional masks," Proceedings of SPIE, vol. 5960, SPIE, 2005.*

* cited by examiner

SYSTEMS AND METHODS WITH EARLY VARIANCE MEASURE USED TO OPTIMIZE VIDEO ENCODING

CROSS-REFERENCE

Priority is claimed from U.S. Provisional Application No. 61/508,907, which is hereby incorporated by reference.

BACKGROUND

The present application relates to transmission and storage of video streams and the like, and more particularly to optimizing use of bandwidth and compute cycles in video transmission and/or storage.

Note that the points discussed below may reflect the hindsight gained from the disclosed inventions, and are not necessarily admitted to be prior art.

Video encoding is widely used to convert images and video streams into forms suitable for transmission over limited bandwidth communications channels. Various video encoding schemes have been developed in attempts to minimize encoding and decoding computation complexity, optimize bandwidth use, improve compressed video image quality and increase energy efficiency.

FIG. 2A shows a generalized example of a video encoding system. A video stream source 20, such as a video camera or rendering program, produces a stream of frames 30. The stream of frames 30 can consist of any visual content 10 that has been recorded or otherwise converted into or generated as a bitstream, such as a sporting event, a movie or television show, a conversation, or a computer graphics demonstration.

The stream of frames 30 enters a video encoder 40, which can use any video encoding/decoding scheme, such as AVC, MPEG-2, VC-1 or Ogg Theora. The video encoder 40 produces an encoded bitstream 50, which can be transmitted over any communications channel 60, including storage, wired, wireless or other means such as a USB stick, DVD, Internet, home network or wireless phone network.

Ultimately, an encoded bitstream 50 is received at a decoder 70, which decodes the encoded bitstream 50 and sends the resulting decoded video stream 80 to a display device 90 to be displayed 100. While the choice of display device 90 may depend on the particular visual content 10, generally, any display device 90 can be used, such as a video-capable mobile phone, a tablet computer, a laptop or desktop computer screen or a television.

H.264/MPEG-4 Part 10, also called Advanced Video Coding or AVC, is one example of a standardized video encoding/decoding scheme, and is used for recording, compression and distribution of high definition video. The AVC specification can be obtained from the International Telecommunication Union web site.

FIG. 2B shows a conventional implementation of AVC encoding. The video encoder 40 initially receives a frame 110 from a stream of frames 30.

A frame 110 is composed of pixels. A pixel is a single point in a recorded image, and is comprised of one or more samples 250. A sample 250 is the intersection of a channel and a pixel-that is, a sample 250 is a portion of a pixel that describes an attribute of the pixel, such as color (also called "chroma") or brightness (also called "luminance" or "luma"). Pixels encoded in AVC can include luma samples, chroma samples, monochrome samples or single-color samples, depending on the type of picture. Samples 250 are comprised of bits. Different samples 250 can be comprised of different numbers of bits.

FIG. 2C shows the composition of an individual frame 110 of a stream of frames 30 in a generalized video encoding system. A frame 110 has a given height and width in pixels. Generally, a frame 110 has the same height and width in luma samples as it does in pixels (this may not be true with respect to chroma samples). The frame size is its height multiplied by its width. For groups of samples 230 of size P×Q, a frame 110 contains frame size/P×Q groups of samples 230. For patches of samples 240 of size M×N, a group of samples 230 contains P×Q/M×N patches of samples 240.

FIG. 2D shows the composition of an individual frame 110 of a stream of frames 30 encoded using AVC. In AVC, samples 250 are arranged into two-dimensional arrays called macroblocks 260. A macroblock 260 can contain a 16×16 block of luma samples and two corresponding blocks of chroma samples (of varying sizes) of a picture that has three sample arrays, or a 16×16 block of samples of a monochrome picture or a picture that is coded using three separate color planes.

From here on, for convenience, a 16×16 block of luma samples encoded or decoded using AVC will be called a "macroblock" 260 and samples 250 in that macroblock 260 that are referred to will be luma samples 250. A frame 110 contains frame size/256 macroblocks 260. A subset of a macroblock 260 (an array of samples equaling in size or smaller than a macroblock 260) will be called a "sub-block" 270. A (luma) sub-block 270 can be a 16×16, 16×8, 8×16, 8×8, 4×8, 8×4 or 4×4 subset of the macroblock 260 (subsets of blocks of chroma samples can be different sizes). Sub-blocks 270 described hereinbelow for exemplary purposes will be size 4×4 unless stated otherwise.

As stated above, FIG. 2B shows an implementation of a conventional AVC video encoder 40. A frame 110 from a stream of frames 30 is received by the video encoder 40. Generally, an I-frame is used to begin a stream of frames 30 or a new scene, or to provide a reference frame 210 that, when encoded, will be minimally distorted. P-frames use a prior I-frame or P-frame from the stream of frames 30 as a reference frame 210. B-frames can use both a prior and a later frame in the stream of frames 30 as reference frames 210.

Intra Prediction 120 or Inter Prediction 130 is performed on each macroblock 260 in the frame 110 depending on factors including whether the frame 110 is an I-type, P-type or B-type frame. Partitioning into sub-blocks 270 occurs in both types of prediction. Mode Select 140 picks from an available set of pre-defined rules that Intra Prediction 120 or Inter Prediction 130 uses to recreate each sub-block 270 as nearly as possible based on the contents of nearby sub-blocks 270. Subtracting 150 the predicted contents of the sub-block 270 from the actual contents of the sub-block 270 is intended to result in a bitwise representation of the sub-block 270 that is as close to zero as possible; smaller numbers take fewer bits to encode than larger numbers. The chosen prediction rule is encoded along with the Subtraction 150 result so that the sub-block 270 can be recreated by the decoder 70. Prediction is used so that fewer bits are needed to encode the frame 110.

In Intra Prediction 120, a macroblock 260 in the frame 110 that is being predicted is partitioned into sub-blocks 270.

Intra Prediction 120 is performed on each sub-block 270, generating a prediction based on samples 250 adjacent to the sub-block 270. The adjacent samples 250 used in Intra Prediction 120 can, for example, consist of previously decoded and reconstructed samples 250—that is, samples 250 that have already been through the Inverse Quantize 180, Inverse Transform 190 and Add 200 stages to recreate decoded versions of encoded samples 250.

There are twenty-two Intra Prediction 120 modes defined by the AVC specification. Each mode is a set of rules describing how to construct a sub-block 270 from adjacent samples 250. Mode Select 140 attempts to determine the Intra Prediction 120 mode that, based on the adjacent samples 250, can be used to construct a predicted sub-block 270 that most closely resembles the actual sub-block 270.

Once Mode Selection 140 has been completed, the predicted sub-block 270 is Subtracted 150 from the actual sub-block 270 and the result is passed to the Transform 160 stage.

In Inter Prediction 130, each macroblock 260 is partitioned into sub-blocks 270 and prediction is performed based on comparison of the frame 110 currently to be encoded to a reference frame 210 nearby in the stream of frames 30 (or, for B-frames, two nearby reference frames 210, potentially a previous frame and a later frame). The reference frame 210 can consist of a previously decoded and reconstructed frame 110—that is, a frame 110 that has already been through the Inverse Quantize 180, Inverse Transform 190 and Add 200 stages to recreate an encoded and then decoded version of the frame 110. Mode Select 140 determines which Inter Prediction 130 mode to use, including how to partition the macroblock 260, in order to most efficiently encode the macroblock 260.

In Inter Prediction 130, a current motion vector is generated for each sub-block 270 by finding a corresponding sub-block 270 in the reference frame 210 near the location of and containing similar visual content to the sub-block 270 currently being encoded. An offset is then determined between the currently encoding sub-block 270 and the corresponding sub-block 270. A predicted motion vector is generated from previously generated current motion vectors of neighboring sub-blocks 270 in the frame 110. The predicted motion vector is Subtracted 150 from the current motion vector and the result is passed to the Transform 160 stage.

At the Transform 160 stage, an integer block transform is performed on each macroblock 260 resulting from Subtraction 150. The output of the Transform 160 stage is then Quantized 170.

Quantizing 170 consists of multiplying the output of the Transform 160 stage by a multiplication factor and then performing a bitwise right-shift in order to deliberately implement a chosen level of lossiness, thus allocating a particular number of bits to encode each macroblock 260. The purposes of Quantizing 170 include attempting to achieve a desired ratio of visual quality to compression and to match imposed bandwidth limitations.

The amount of bitwise right-shift is determined by a variable called QP. Choice of QP determines how much detail is retained in the frame 110 and how many bits will be required to encode the frame 110. QP is chosen by rate control, which is part of Quantizing 170.

Once the frame 110 is Quantized 170, the resulting bitstream passes through a Bitstream Encode 220 stage, which typically includes a reordering stage and a lossless entropy encoding stage. The frame 110 is then output by the encoder 40.

The Quantizing 170 result also is sent to an Inverse Quantizing stage 180, where Quantizing 170 is reversed; an Inverse Transform 190 stage, where the Transform 160 is reversed; and an Add 200 stage, where the prediction that was originally Subtracted 150 is Added 200 back in. The result of the Add 200 stage is a decoded version of the frame 110, which can then be used by the encoder 40 as a reference frame 210.

FIG. 2E schematically shows an example of conventional end-to-end encoding and decoding in the context of an internet user. Visual content 10 is digitized and sent to an encoder 40. The encoded content is then uploaded 55 to the Internet 65. The encoded content can then be downloaded 67 by a user. The user's device decodes 70 the encoded content, and the user's display device 90 displays 100 the decoded visual content 10. It is advantageous for a user experience for downloading 67 and decoding 70 to be as fast as possible, and for the displayed 100 visual content 10 to be as high quality as possible.

SUMMARY

The present application discloses inventions which in various ways, whether together or separately, use a measurement of variance to modify various video encoding and communication stages.

The disclosed innovations, in various embodiments, provide one or more of at least the following advantages. However, not all of these advantages result from every one of the innovations disclosed, and this list of advantages does not limit the various claimed inventions.

Improved video stream image quality for a given bandwidth limitation
Decreased bandwidth usage for a given video stream image quality
Reduced compute cycle usage at the encoding stage
Reduced power consumption at the encoding stage
Reduced heat emission at the encoding stage
Reduced bandwidth usage
Faster downloading of videos from the interne
More efficient allocation of bandwidth in shared-user environments
Better video quality from lower-cost decoding stages
Avoids unnecessary encoding steps
Reduced compute cycle usage at the decoding stage
Reduced power consumption at the decoding stage
Reduced heat emission at the decoding stage.
May be used to target particular devices, such as low-bandwidth mobile devices

BRIEF DESCRIPTION OF THE DRAWINGS

The disclosed inventions will be described with reference to the accompanying drawings, which show important sample embodiments of the inventions and which are incorporated in the specification hereof by reference, wherein.

DETAILED DESCRIPTION OF SAMPLE EMBODIMENTS

The numerous innovative teachings of the present application will be described with particular reference to presently preferred embodiments (by way of example, and not of limitation). The present application describes several inventions, and none of the statements below should be taken as limiting the claims generally.

The disclosed inventions can be implemented in many variations on the structures and methods described in FIGS. 2A, 2B, 2C and 2D and 2E.

Figure 3A:
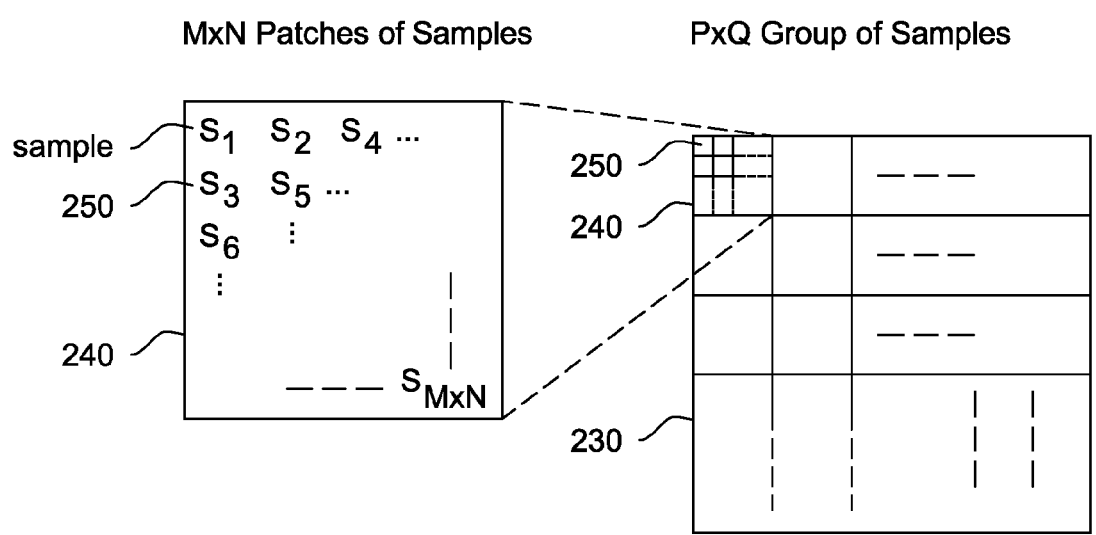
FIG. 3A shows generation of a variance measure for groups of samples and patches of samples.

FIG. 3A shows generation of a variance measure for groups of samples 230 and patches of samples 240. For a group of samples 230 composed of patches of samples 240, a variance measure 280 can be generated by finding the patch-wide average of a value for each of the M×N samples 250 in each patch 240 for a first step; for each patch 240, creating the sum of the absolute differences between the value of each sample 250 and the corresponding average value of that patch 240 for a second step; and averaging the sums of absolute differences for a third step.

The value used to generate the variance measure 280 can advantageously be chosen to be average luminance pixel value.

A variance measure 280 can be applied at any one or a combination of several stages of the video encoder 40 to reduce compute cycle usage, increase heat and energy efficiency, reduce target bandwidth usage by the encoded bitstream 50, reduce the amount of time to store the encoded bitstream 50 or the size of storage media required to do so, reduce the amount of time or bandwidth required for transmission of the encoded bitstream 50, or improve the visual quality of the decoded video stream 80.

Implementation of several inventive embodiments can be described using the AVC encoding/decoding scheme as a demonstrative framework.

Figure 3B:
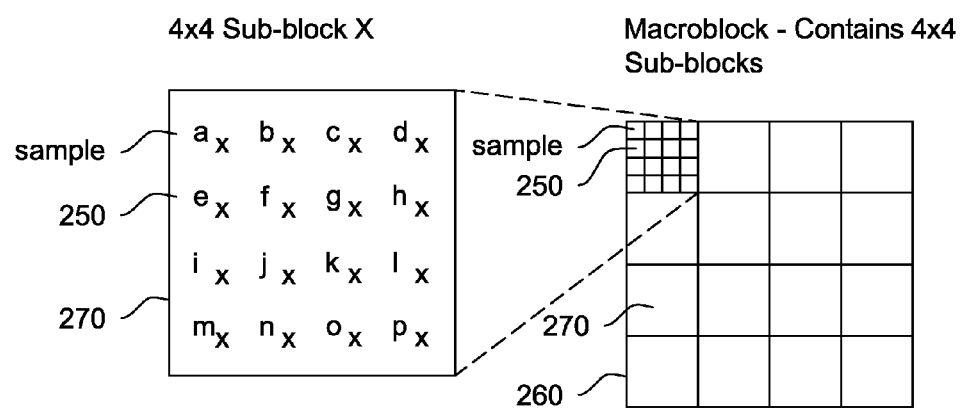
FIG. 3B shows generation of a variance measure on a video encoder using AVC.

FIG. 3B shows generation of a variance measure on a video encoder 40 using AVC. When using AVC, it is advantageous for the P×Q sized group of samples 230 to be chosen to be a 16×16 macroblock 260 of luma samples, and for the M×N sized patches of samples 240 to be chosen to be 4×4 sub-blocks 270 of luma samples contained within such macroblock 260. The embodiments described herein will assume P×Q to be 16×16 and M×N to be 4×4, though other measurements can be used in various other embodiments.

For a macroblock 260 composed of sub-blocks 270, a variance measure can be generated by finding the sub-block-wide average of a value for each of the 4×4 samples 250 in each sub-block 270 for a first step; for each sub-block 270, creating the sum of the absolute differences between the value of each sample 250 and the corresponding average value of that sub-block 270 for a second step; and averaging the sums of absolute differences for a third step.

Figure 1:
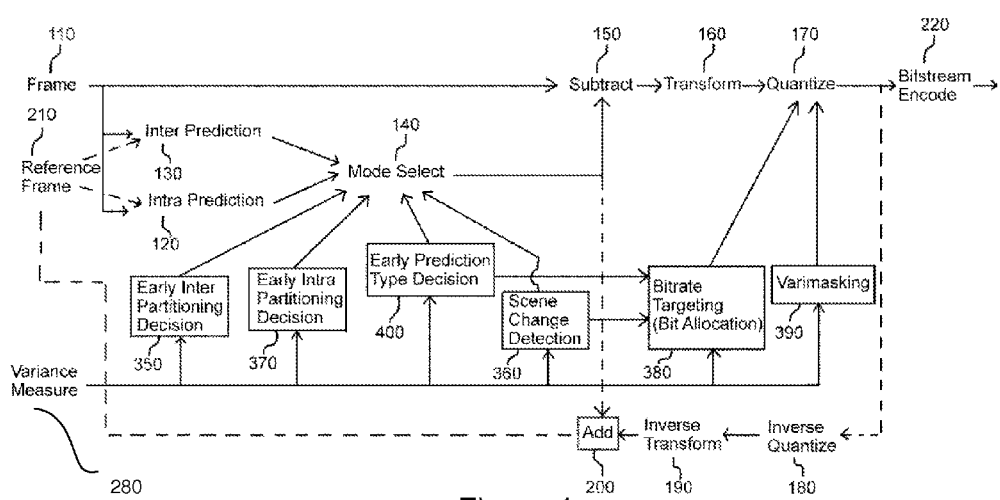
FIG. 1 schematically shows several inventive embodiments and the stages of a typical AVC encoder that they directly modify.
Figure 2A:
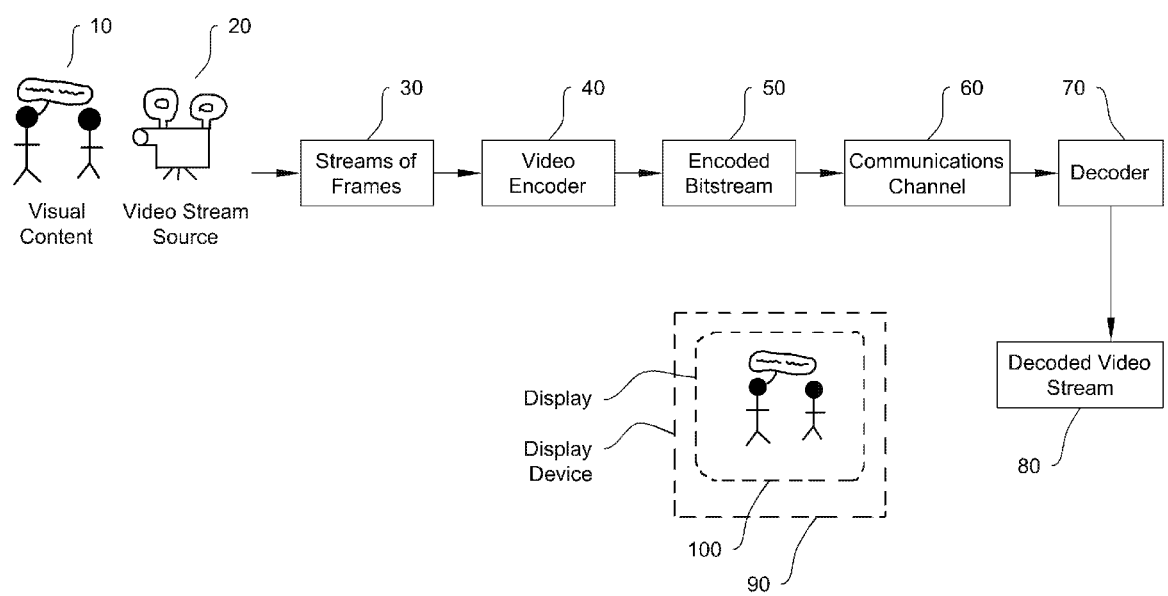
FIG. 2A shows an example of end-to-end encoding and decoding, from creation of visual content to display of that visual content by an end-user.
Figure 2B:
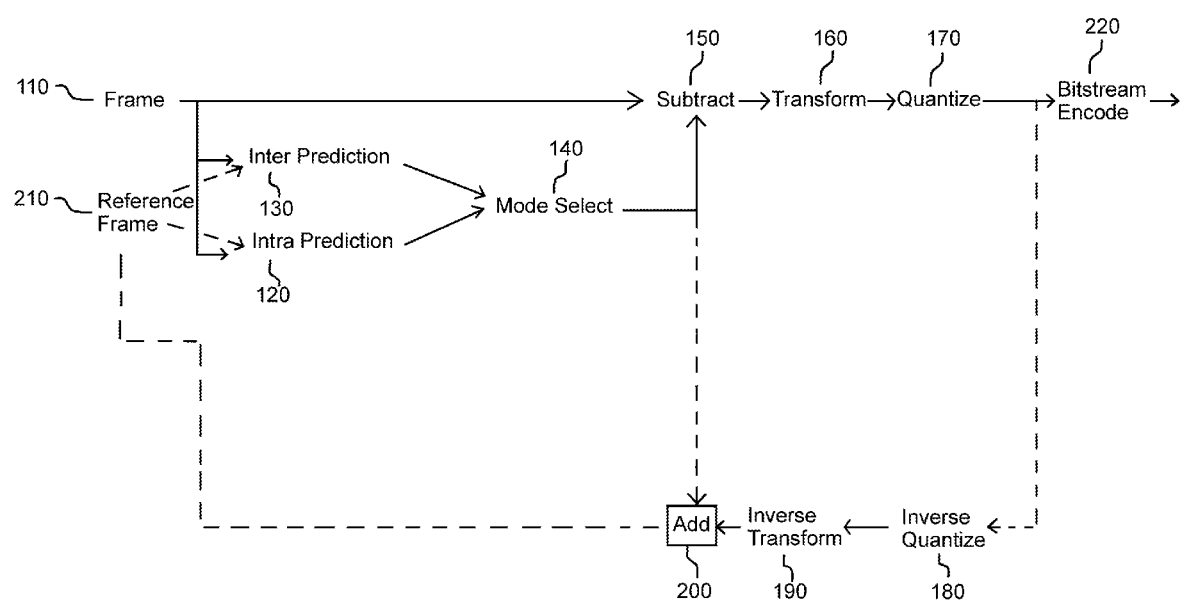
FIG. 2B shows an example of a conventional video encoder using the AVC encode/decode standard.
Figure 2C:
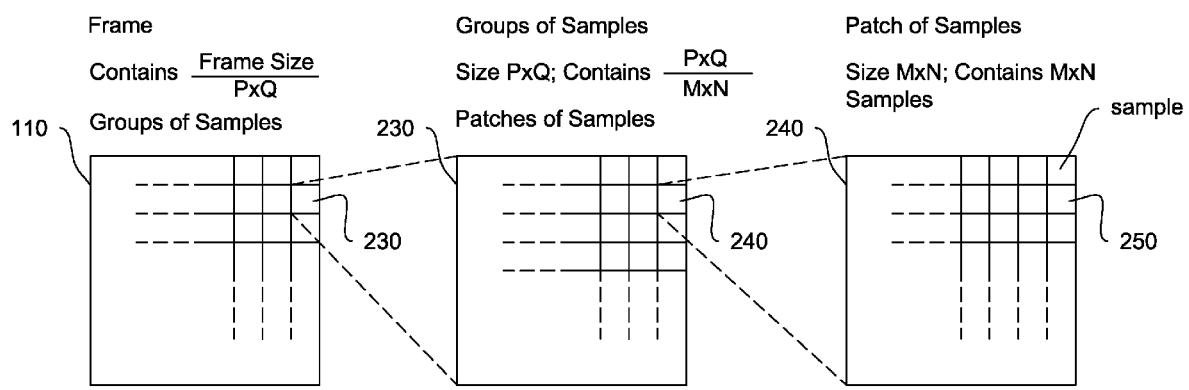
FIG. 2C shows a schematic diagram of the nesting of patches of samples within groups within a frame.
Figure 2D:
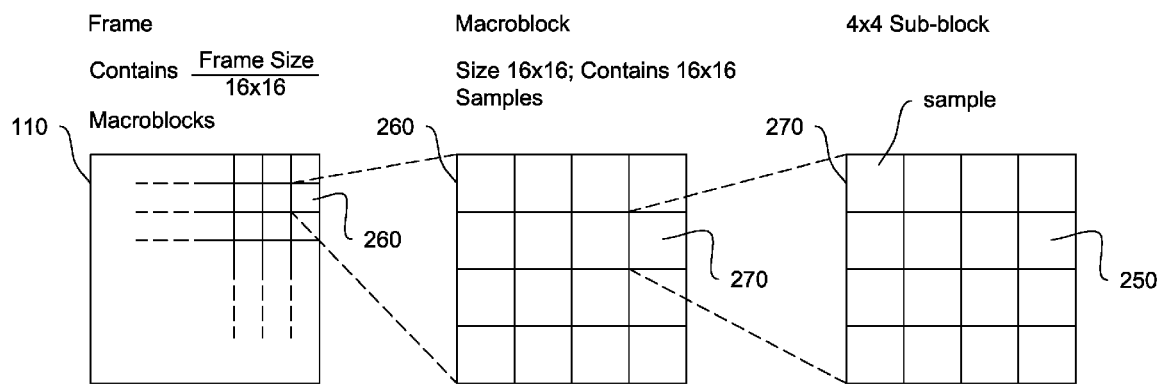
FIG. 2D shows a schematic diagram of the nesting of 4×4 sub-blocks within macroblocks within a frame.
Figure 2E:
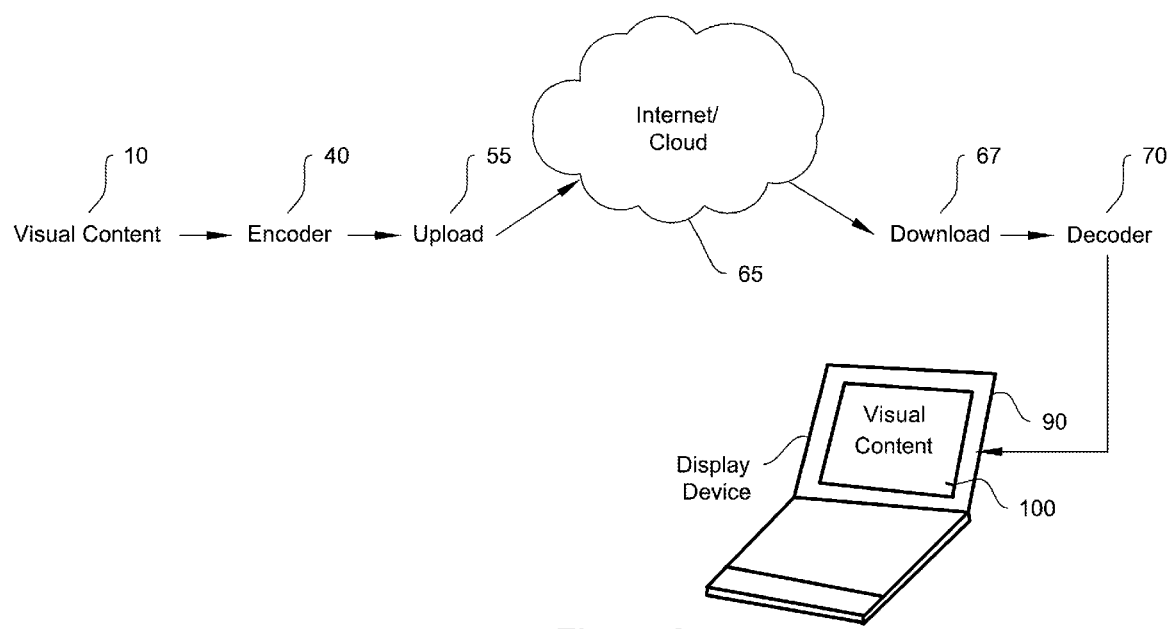
FIG. 2E schematically shows an example of conventional end-to-end encoding and decoding in the context of an Internet user.

FIG. 1 schematically shows several inventive embodiments applied to a video encoder using AVC: Early Inter Partitioning Decision 350 directly affects the partitioning aspect of the Mode Select 140 stage, Scene Change Detection 360 and Early Prediction Type Decision 400 directly affect Bitrate Targeting 380 and the Mode Select 140 stage, Early Intra Partitioning Decision 370 directly affects the Mode Select 140 stage, and Bitrate Targeting 380 and Varimasking 390 directly affect the Quantize 170 stage.

Scene Change Detection

Figure 3C:
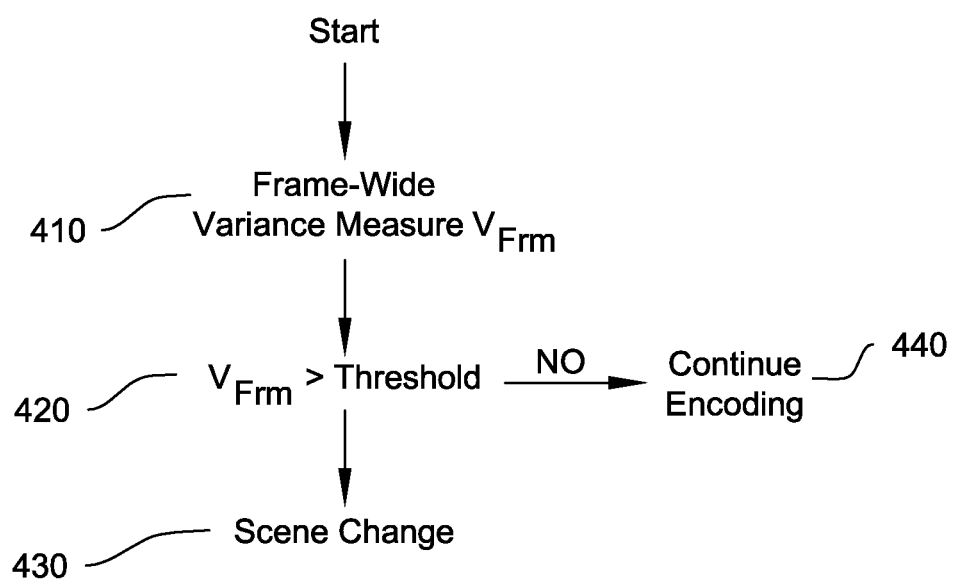
FIG. 3C shows an embodiment of a method of using a variance measure for scene change detection.

FIG. 3C shows an embodiment of a method of using a variance measure for Scene Change Detection 360. A frame-wide variance is used for this purpose.

A frame-wide variance measure $V_{frm}$ can be generated 410 by taking the average of the variance measures 280 for all macroblocks 260 in a frame 110. The variance measures 280 for the macroblocks 260 can be generated as shown in FIG. 3B. The frame-wide variance measure for the frame 110 can then be compared 420 to the frame-wide variance measure for a reference frame 210, such as a consecutively previous frame. If the difference between the frame-wide variance measures exceeds a threshold, then scene change can be deemed to have occurred 430, and the encoder is alerted that macroblocks encoded using Intra Prediction 120 will predominate. Otherwise, encoding continues normally 440.

There are cases where different input signals may have similar frame-wide variance measures. In order to capture these cases, it is advantageous to divide the frame 110 into n non-overlapping regions; generate region-wide variance measures in a similar fashion to generation of the frame-wide variance, but based on the macroblocks 260 within each region, rather than all macroblocks 260 within the frame 110; and compare the region-wide variance measures to corresponding region-wide variance measures of a reference frame 210. It is further advantageous to select n to be 4, so that large portions of the frame 110 are compared. If the signal is continuous between frames 110, large regions of the frames 110 should have similar region-wide variance measures. If the signal is not continuous, the greater detail level of analysis should reduce the rate of coincidental similarity of large-scale variance measures.

Early Inter Partition Decision

In both Intra Prediction 120 and Inter Prediction 130, each macroblock 260 is partitioned into non-overlapping sub-blocks 270 with sizes M×N depending on the Mode Selected 140, which is related to the complexity of the macroblock 260. More accurate prediction can enhance the visual quality of the decoded video stream 80 or reduce the number of bits required to encode the frame 110.

In both Intra Prediction 120 and Inter Prediction 130, smaller partitions generally allow more accurate prediction, which can improve visual quality of the decoded video stream 80. However, each sub-block 270 must be encoded, requiring expenditure of bits and compute cycles. Smaller sub-blocks 270 generally require, in aggregate, more bits to represent in an encoded bitstream 50 than larger sub-blocks 270. Therefore, partitioning decisions are typically a balancing act between visual quality on the one hand and bandwidth and compute cycle usage on the other.

Prediction is performed on each sub-block 270 of each macroblock 260.

Figure 3D:
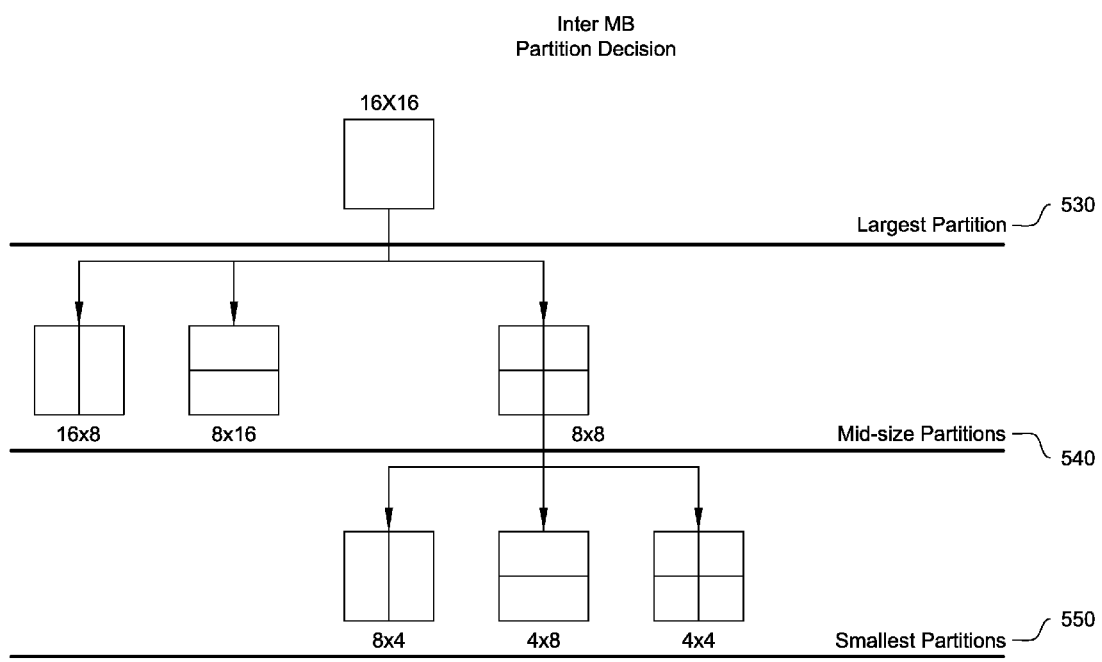
FIG. 3D shows exemplary partition sizes used by the inventive embodiment of FIG. 3E.
Figure 3E:
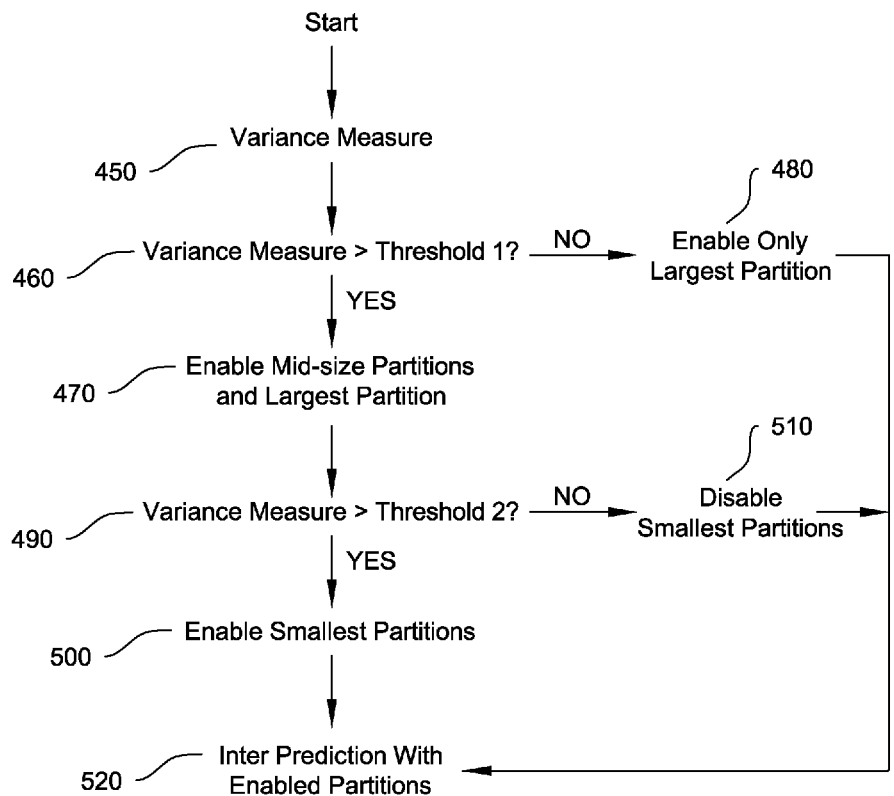
FIG. 3E shows an embodiment of a variance measure being used to make early partitioning decisions for macroblocks that are predicted using Inter Prediction.

FIG. 3D shows exemplary partition sizes used by the inventive embodiment of FIG. 3E.

FIG. 3E shows an inventive embodiment of a variance measure 280 being used to make Early Inter Partitioning Decisions 350 for macroblocks 260 that are predicted using Inter Prediction 130. A variance measure 280 is generated 450 and then compared to a first threshold 460. If the variance measure 280 is greater than the first threshold, then the largest partition 530 and mid-sized partitions 540 are enabled 470. If the variance measure 280 is not larger than the first threshold, then only the largest partition 530 is enabled 480 and Inter Prediction 130 proceeds 520 with only the prediction modes available corresponding to the enabled size 520.

The variance measure 280 is then compared to a second threshold 490. If the variance measure 280 is larger than the second threshold, then the smallest partitions 550 are enabled 500 and Inter Prediction 130 proceeds 520 with prediction modes available corresponding to all partition sizes. If the variance measure 280 is not larger than the second threshold 510, then Inter Prediction 130 proceeds 510 with only the prediction modes available corresponding to mid-sized partitions 540 and the largest partition 530.

Early Prediction Type Decision

Mode Select 140 selects the prediction mode that most accurately reproduces a sub-block 270.

Figure 3F:
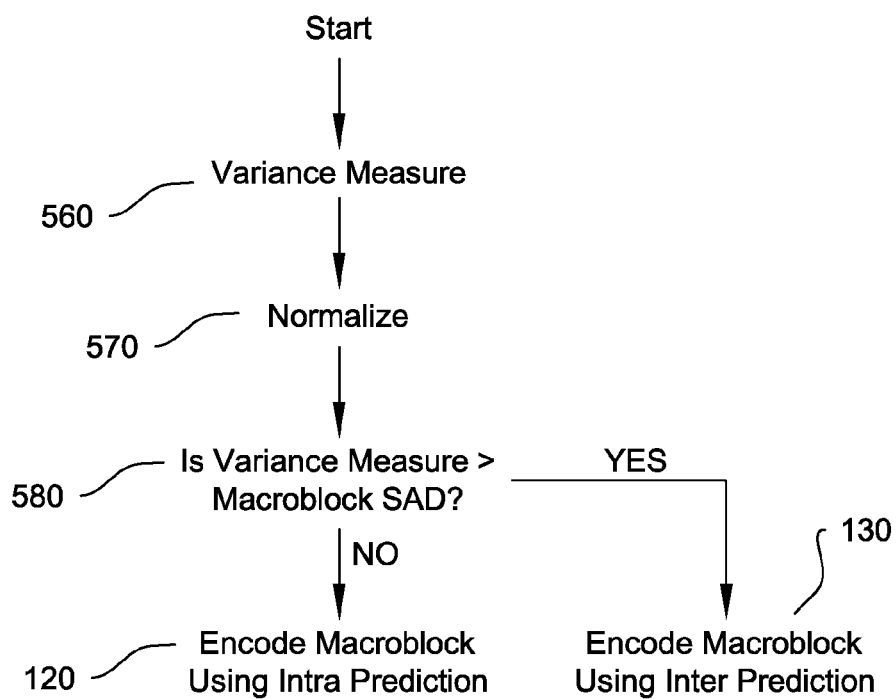
FIG. 3F shows an embodiment of a method for making early mode selection decisions using a variance measure.

FIG. 3F shows an embodiment of a method for making Early Prediction Type Decisions 400 using a variance measure 280.

In a P-frame or B-frame, macroblocks 260 can be encoded using Intra Prediction 120 or Inter Prediction 130. For example, following a scene change, methods used for encoding I-frames can be used to encode a P-frame since the P-frame is likely to contain many macroblocks encoded using Intra Prediction 120.

Early Prediction Type Decision 400 employs a variance measure 280 to determine whether to use Intra Prediction 120 or Inter Prediction 130 to encode a macroblock 260.

A variance measure 280 is generated 560 for the macroblock 260 and then normalized 570 using a scale factor. The scale factor can be tuned to bias (or not) Early Prediction Type Decision 400 towards Intra Prediction 120 or Inter Prediction 130.

The normalized variance measure is then compared to the Sum of Absolute Differences (SAD) 580 of the macroblock 260, using a corresponding macroblock 260 of a reference frame 210 to generate the SAD. If the normalized variance measure is greater than the SAD, the macroblock 260 is encoded using Inter Partitioning 130. If the normalized variance measure is not greater than the SAD, then the macroblock 260 is encoded using Intra Prediction 120.

When Inter Prediction 130 is used to encode a current macroblock 260, a Sum of Absolute Differences (SAD) is generated on a per sample 250 basis to determine how similar the macroblock 260 is to a corresponding reference macroblock 260 in a reference frame 210. A normalized variance measure is similar to a SAD, where the reference macroblock 260 is formed from the average luminance values of the 4×4 sub-blocks 270 of the macroblock 260. SAD-like results are obtained for each 4×4 sub-block 270 by generating the sum of the absolute differences between each sample value and the average luminance value; however, the resulting SAD-like value is obtained using 16 sums, rather than the 256 sums used to obtain an SAD for Inter Prediction 130. Because the variance measure 280 for the macroblock 260 is a mean of the SAD-like values for the 4×4 sub-blocks 270, its magnitude is the same as that of a SAD with 16 sums of absolute luminance differences. It is advantageous to normalize the variance measure 280 so that the variance measure 280 and the macroblock 260 SAD have similar magnitude prior to comparison.

Note that Intra Prediction 120 modes create reference macroblocks 260 whose samples 250 are in various ways averages of local samples 250. Then, a SAD can be used to measure the difference between the reference macroblock 260 and the currently encoding macroblock 260.

Early Prediction Type Decision 400 uses the reference macroblock 260 formed from averaged 4×4 sub-block 270 luma samples 250 to generate a SAD, so that the currently encoding macroblock 260 can be compared to a predicted macroblock 260. This generated SAD—actually, the average of SADs for each 4×4 sub-block 270—is the variance measure 280. The variance measure 280 emulates the comparison of a reference macroblock 260 to a currently encoding macroblock 260 by creating a reference macroblock 260 from the averaged 4×4 sub-block 270 luma samples 250.

Early Intra Partitioning Decision

Figure 3G:
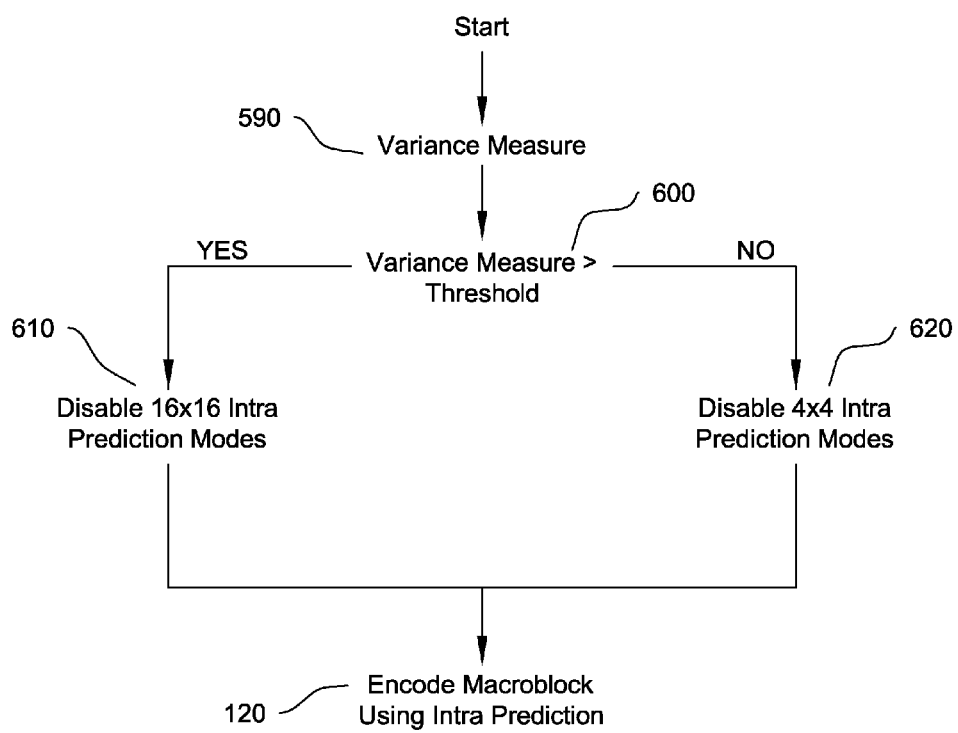
FIG. 3G shows an embodiment of a method for making early partitioning decisions for macroblocks that are predicted using Intra Prediction.

FIG. 3G shows an embodiment of a variance measure used to make an Early Intra Partitioning Decision 370. Early Intra Partitioning Decision 370 can be applied to determine the Intra Prediction 120 mode which, based on samples adjacent to the sub-block 270, most accurately reproduces the sub-block 270. The most accurate such reproduction of the sub-block 270 becomes the predicted sub-block 270. There are twenty-two (luma) Intra Prediction 120 modes in AVC: four modes for 16×16 sub-blocks 270, nine modes for 8×8 sub-blocks 270, and nine modes for 4×4 sub-blocks 270.

Checking the results of all twenty-two Intra Prediction 120 modes to determine which mode is best can consume a large number of compute cycles.

If Intra Prediction 120 is being used to encode a macroblock 260, a variance measure 280 can be used to eliminate a prediction sub-block size for that macroblock 260, thus eliminating several Intra Prediction 120 modes at once without having to check the results of each of the eliminated Intra Prediction 120 modes.

A variance measure 280 is generated 590 for a macroblock 260. The variance measure 280 is compared to a threshold 600. If the variance measure 280 is greater than the threshold, then the Intra Prediction 120 modes for 16×16 sub-blocks 270 are disabled 610 for that macroblock 260. If the variance measure 280 is not greater than the threshold, then the Intra Prediction 120 modes for 4×4 sub-blocks 270 are disabled 620 for that macroblock 260. The macroblock 260 can then be encoded using Intra Prediction 120 without checking the results of the disabled prediction modes.

Bitrate Targeting

Certain video encoder 40 applications require that the number of bits to encode a frame 110 must be constant. A variance measure 280 can be advantageously employed in Bitrate Targeting 380 frames.

Bitrate Targeting 380 can be illustrated using I-type frames. An I-type frame 110 is typically encoded exploiting only the spatial data of that frame. Generally, the first frame 110 of an encoded bitstream 60 is encoded as an I-frame. It is also typical to designate every n-th (but not necessarily periodic or of period using a single interval) frame 110 in a stream of frames 30 an I-frame in order to reduce errors propagated through sets of P-frames and B-frames.

For the purposes of the following embodiment, it is advantageous in AVC encoding for P×Q to be selected to correspond to non-overlapping 16×16 luma macroblocks 260 and M×N to be selected to correspond to the sixteen (16) non-overlapping 4×4 sub-blocks 270 of the 16×16 luma macroblocks 260.

The goal of Bitrate Targeting 380 for a frame 110 is to efficiently determine a QP that will allow the frame 110 to be encoded using the required number of bits.

Figure 3H:
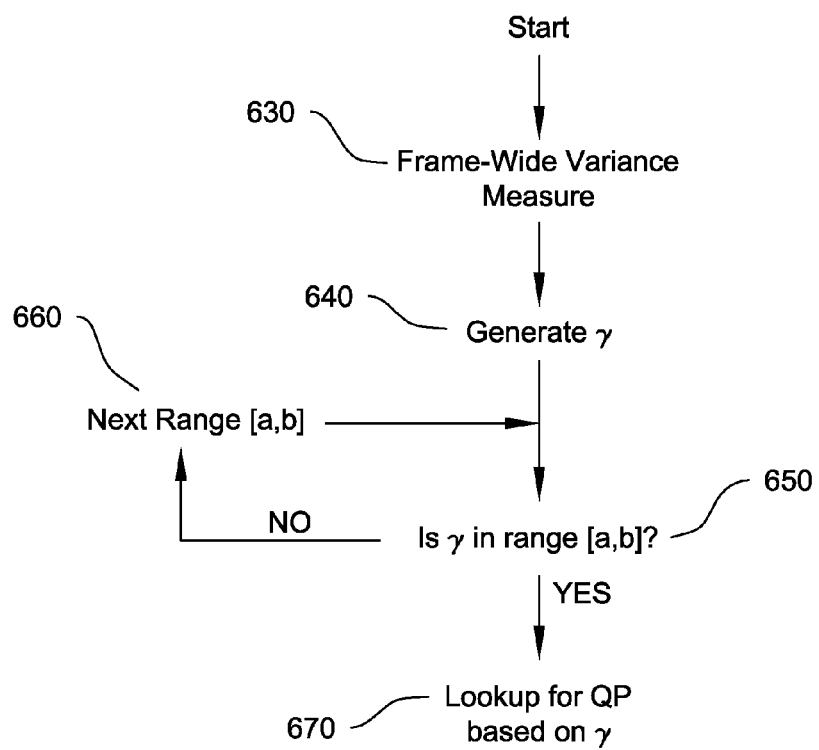
FIG. 3H shows an embodiment of a method of using a variance measure to determine QP based on a known limited number of bits available to encode a frame.

FIG. 3H shows an embodiment of a method of using a variance measure 280 to determine QP based on a known limited number of bits available to encode a frame 110. Conventionally, β is the number of bits estimated to be necessary to encode the frame 110. Here, a bandwidth budget has been provided for the frame 110, and β is set to equal the budgeted number of bits that can be used to encode the frame 110.

The frame-wide variance $V_{frm}$ is generated 630 as the average of the variance measures 280 for all macroblocks 260 in the frame 110. The frame-wide variance is then used to generate γ 640. For this purpose, N is the number of luma macroblocks 260 in the frame 110 and γ is a scale factor that can be used in conjunction with a lookup table to determine QP for the frame 110. γ is generated as follows:

$$\gamma = (\beta * \phi)/(N * V_{frm}) \qquad \text{Equation 1:}$$

φ is a correction factor, advantageously set initially to 1. Once a frame 110 has been encoded and the actually number of bits taken for encoding $I_{bits}$ is known, later frames 110 in the stream of frames 30 can be more accurately Bitrate Targeted 380 by generating the correction factor φ as follows:

$$\phi = I_{bits}/\beta \qquad \text{Equation 2:}$$

γ is compared to various γ ranges [a, b], a and b corresponding to QP values x and y, respectively, in a lookup table 650. If γ is within the range [a, b], then the frame 110 is assigned an interpolated QP corresponding to that range 670. Otherwise, a new range [a, b] is selected for comparison to γ 660 and the comparison is repeated 650 until a match is found.

The table of γ values used to test in step 650 is determined as follows, the entries in the table corresponding to QP values.

$$\gamma = \gamma_{QP} + (V_{ref} - V_{frm})/a_0 - NV_{idx}/a_1 \qquad \text{Equation 3:}$$

$\gamma_{QP}$ is generated by finding an average of the γ determined for a series of I-frames at a given QP; a table of $\gamma_{QP}$ corresponding to various QP can thus be generated. $\gamma_{QP}$ in Equation 3 corresponds to the QP being used to encode the macroblock 260. If QP>20, then $\gamma_{QP}$ will be much larger than the other terms in Equation 3, and γ can be set to $\gamma_{QP}$.

$NV_{idx}$ is the percentage of macroblocks 260 in the frame 110 to be encoded with variance measure 280 near zero. $V_{ref}$ is the average frame-wide variance measure measured in a large number of different streams of frames. $a_0$ and $a_1$ are normalization constants determined through statistical analysis of γ deviations for sequences of streams of frames encoded using QP<20.

Bitrate Targeting 380 is particularly advantageous when used on I-frames because errors in I-frame encoding can be propagated through the following P-frames and B-frames, and can persist until a new I-frame is designated. Correct prediction of frame bits allows QP to be well-chosen to achieve a selected ratio of quality to compression, thus potentially avoiding undesired reference frame 210 distortions that can consume valuable compute cycles to compensate for, or that can introduce a persistent decrease in visual quality, when encoding P-frames and B-frames.

Bitrate Targeting 380 can also be used on P-frames, using a variance measure 280 and the same analysis as for I-frames, to estimate the number of bits required to encode the P-frame and subsequently generate a well-chosen QP.

A variance measure 280 used for Bitrate Targeting 380 on P-frames is generated as shown in FIG. 3B, except that at every instance where a sample 250 value would be used, the difference between a value of the sample 250 in a frame 110 and the value of a corresponding sample 250 in a reference frame 210 is used.

Bitrate Targeting: NALU Packing

Figure 3I:
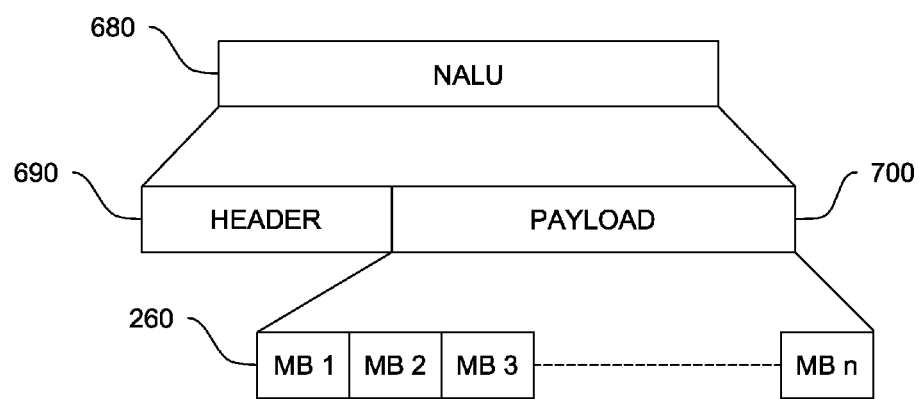
FIG. 3I shows a schematic diagram of a NALU (Network Abstraction Layer Unit) and macroblocks packed therein.

FIG. 3I shows a schematic diagram of a NALU 680 (Network Abstraction Layer Unit) and macroblocks 260 packed therein. A NALU 680 is comprised of a header 690 and a payload 700. The header 690 contains data governing transmission, while the payload 700 contains encoded frames 110 or macroblocks 260 comprising portions of frames 110 from the stream of frames 30. Communications networks may expect particular packet sizes. Bitrate Targeting 380 can be employed to determine how many macroblocks 260 can fit within an NALU payload 700 without exceeding the packet size specified by the network.

Figure 3J:
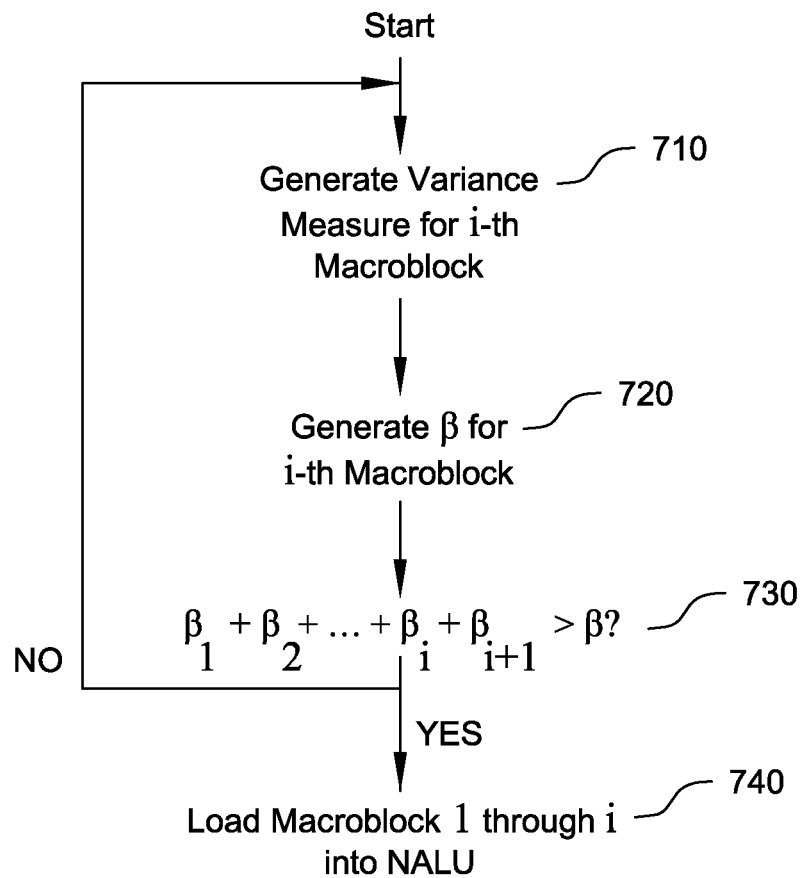
FIG. 3J shows an embodiment of NALU packing using Bitrate Targeting.

FIG. 3J shows an embodiment of NALU Packing using a variance measure. A NALU 680 may have an imposed maximum size of L bits, made up of C bits for the header 690 and β bits for the payload 700; L=C+β.

$$\gamma * V_{mbi} = \beta_i \qquad \text{Equation 4:}$$

$V_{mbi}$ is generated 710 as a variance measure 280 of an i-th macroblock 260 and $\beta_i$ is the bit budget for that i-th macroblock 260. $\beta_i$ can be determined 720 by generating γ. Here, because a single macroblock 260 is being tested, γ equals $\gamma_{QP}$.

Once a set of $\beta_i$ for macroblocks 260 in a frame 110 are determined, macroblocks 260 can be allocated to an NALU until the sum of the $\beta_i$ for a set of n macroblocks 260, plus an n+1 macroblock 260, plus C, would be greater than L 730. The n macroblocks 260 are then allocated 740 to the NALU 680.

Varimasking

Figure 3K:
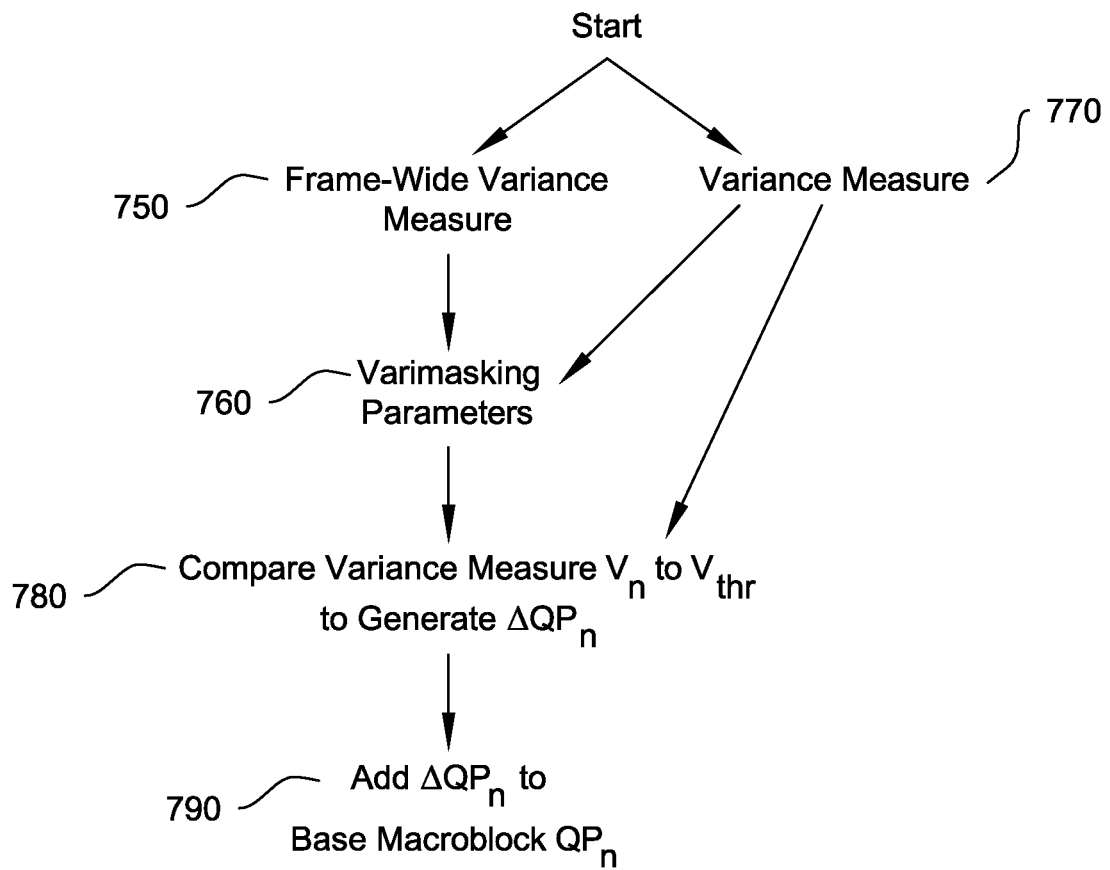
FIG. 3K shows an embodiment of using a variance measure to generate a ΔQP to control bit length allocation to individual macroblocks.

FIG. 3K shows an embodiment of using a variance measure 280 to generate a ΔQP to control bit length allocation to individual macroblocks 260. ΔQP is applied on a macroblock-by-macroblock basis to the frame-wide QP typically used to Quantize 170 a frame 110.

The human eye is generally insensitive to high frequencies in the spatial domain, and can be modeled as a low pass filter. Therefore, ΔQP can be applied to enhance the visual quality of a decoded video stream while preserving a fixed level of bandwidth usage by allocating more bits to macroblocks 260 to which the eye is more sensitive, and fewer bits to macroblocks 260 to which the eye is less sensitive. ΔQP can also be applied to decrease bandwidth usage for a particular visual quality by allocating fewer bits to macroblocks 260 to which the eye is less sensitive while not changing Quantizing 170 of macroblocks 260 to which the eye is more sensitive.

Generally, macroblocks 260, which carry visual information as spatial data, carry information spanning the whole frequency spectrum, meaning some of the spatial data described by the macroblock 260 may be equivalent to frequency components that cannot be perceived by the human eye—that is, redundant visual data.

An advantage of varimasking 390 is that it allows the encoder 40 to detect redundant visual data without performing a transformation on the macroblock 260 from spatial to frequency domain; such transformations generally require binary multiplications, which can consume large numbers of compute cycles.

Generally, the higher a variance measure 280 for a macroblock 260, the higher the frequencies present in that macroblock 260. Also, in a typical frame 110, a graph of the number of macroblocks 260 with a particular variance measure 280 resembles a Poisson distribution of average γ.

As shown in FIG. 3K, a frame-wide variance measure $V_{frm}$ is generated 750, comprising the average of all variance measures 280 of all macroblocks 260 in the frame. The frame-wide variance measure is then used to generate varimasking parameters 760, as follows.

A variance threshold $V_{thr}$ is selected to detect macroblock 260 luminance distribution complexity. The value of $V_{thr}$ determines a resulting ratio of visual quality to compression. Macroblocks 260 with variance measure 280 greater or less than $V_{thr}$ have their QP increased or decreased by an amount ΔQP, respectively.

By default, $V_{thr}$ equals $V_{frm}$, but $V_{thr}$ can be modified by δ, an arbitrary offset that, if set to be non-zero, biases the results of varimasking 390 towards a particular ratio of perceived quality to compression efficiency. Another way of considering δ is that it affects the balance of the populations of the group of macroblocks 260 from which bits can be stolen by increasing QP, and the group of macroblocks 260 two which bits can be given by decreasing QP.

$$V_{thr} = V_{frm} + \delta \quad \text{Equation 5:}$$

F(x) calls a lookup table based on results of empirical analysis. G characterizes the rate of the varimasking 390 filter. The smaller the G, the larger the ΔQP; the larger the G, the smaller the ΔQP.

$$G = F(V_{frm}) \quad \text{Equation 6:}$$

$V_n$, the variance measure 280 for an n-th macroblock 260, is generated 770.

$\Delta QP_n$, the ΔQP to be applied to an n-th macroblock, is directly proportional to the difference between $V_{thr}$ and the variance measure 280 for the n-th macroblock 260.

$$\Delta QP_n = (V_n - V_{thr})/G \quad \text{Equation 7:}$$

$\Delta Q\beta_n$ can be clamped between a maximum and minimum value. Subtraction of $V_{thr}$ from $V_n$ has the same effect as comparing between $V_{thr}$ and $V_n$ to determine which is greater 780 because ΔQPn, which can be positive or negative, is added to a base QP for the n-th macroblock 260, $QP_{n-input}$ 790. The result is the $QP_{n-output}$ used to Quantize 170 the n-th macroblock 260.

$$QP_{n-output} = QP_{n-input} + \Delta QP_n \quad \text{Equation 8:}$$

The varimasking parameters for a frame are $V_{thr}$, $V_{frm}$, G and δ. The varimasking parameters for a macroblock in the frame are the varimasking parameters for the frame and $V_n$, $\Delta QP_n$ and $OP_{n-output}$.

Decoder Methods

The same decoder hardware structures as in prior implementations can be used, except that use of the various disclosed inventions will result in fewer compute cycles, download bandwidth (or storage space) and power being required and less heat generated.

Other Embodiments

Figure 4A:
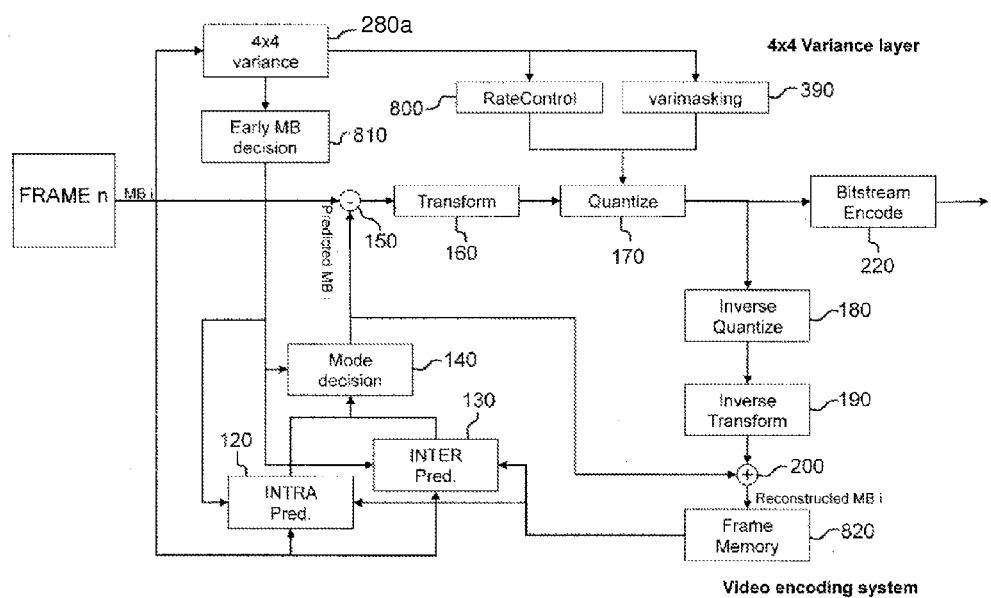
FIG. 4A shows a schematic diagram of another embodiment of an AVC encoder 40 applying a variance measure 280 as generated in FIG. 3B.

FIG. 4A shows a schematic diagram of another embodiment of an AVC encoder 40 applying a 4×4 variance measure 280a as generated, for example, in FIG. 3B. The variance measure can be applied, for example, to Rate Control 800 for Bitrate Targeting; to Varimasking 390; or to Early Macroblock Decision 810 for Scene Change Detection, Early Inter Partitioning Decision, Early Intra Partitioning Decision or Early Prediction Type Decision Frame Memory 820 stores reference frames 210 for use in encoding.

Figure 4B:
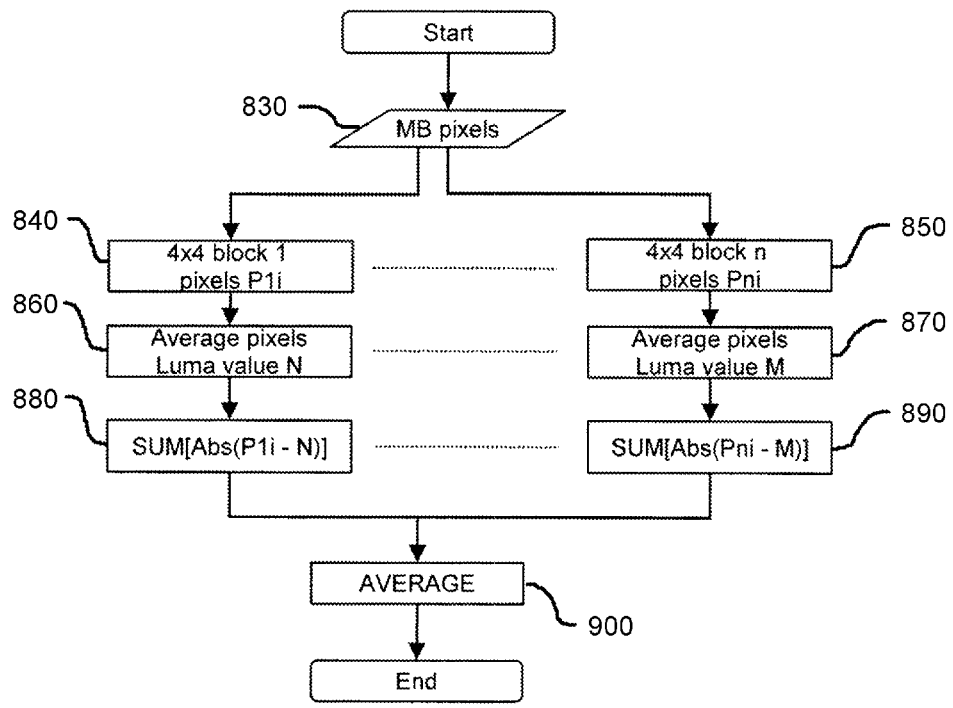
FIG. 4B shows an alternative embodiment of a method of generating a variance measure where M×N is 4×4 and P×Q is 16×16, i.e. using 4×4 sub-blocks to generate a variance measure for a macroblock.

FIG. 4B shows an alternative embodiment of a method of generating a variance measure 280 where M×N is 4×4 and P×Q is 16×16, i.e. using 4×4 sub-blocks 270 to generate a variance measure for a macroblock 260. For a macroblock 260 composed of pixels 830, for each 4×4 sub-block 270 1 840 through n 850 of pixels P[1,n]i, the average luma value of each sub-block 270 is generated, from average value N for sub-block 1 860 through average value M for sub-block n 870. The sum of absolute differences between each luma value and the average value for a sub-block is then generated for each sub-block 1 880 through n 890. The variance measure 280 equals the average of all sums of absolute differences 900.

Program instructions for implementing the inventive embodiments described herein may be installed in fixed, removable, firmware or other memory form for distribution with or later installation on separate or integrated video encoding and decoding devices.

According to some but not necessarily all embodiments, there is provided: A method for video encoding comprising: Generating a variance measure for each respective macroblock of a first frame of a stream of frames; Generating a variance measure for each respective macroblock of a second frame of said stream of frames, said second frame being immediately prior to said first frame in said stream of frames; Assigning a frame type to said first frame by comparing the variance measures of said first frame to the variance measures of said second frame; and Encoding said first frame based on said frame type.

According to some but not necessarily all embodiments, there is provided: A method of video encoding, comprising: generating at least one spatial variance measure across groups of pixels of at least one frame of a stream of frames; and encoding said one frame variably, in dependence on said spatial variance measure; whereby computational load is reduced for ones of said frames which have smaller amounts of spatial variance.

According to some but not necessarily all embodiments, there is provided: A method for video encoding comprising: using a computing apparatus, generating spatial variance measures for respective macroblocks of at least one frame of a stream of frames; using a computing apparatus, encoding said frame such that the lossiness of said encoding is at least partially dependent on said spatial variance measure, to thereby generate an encoded data stream which generally corresponds to said frame; and transmitting said encoded data stream, whereby said encoded data stream can be decoded at a receiving device to generate a recovered stream which generally corresponds to said frame.

According to some but not necessarily all embodiments, there is provided: A method for video encoding comprising: generating a spatial variance measure for at least one macroblock of at least one frame of a stream of frames; choosing a prediction mode at least partially in dependence on said spatial variance measure of said at least one macroblock; generating a prediction of values for said at least one macroblock, using said prediction mode; and encoding said at least one macroblock at least partially in dependence on said prediction.

According to some but not necessarily all embodiments, there is provided: A method for video encoding comprising: generating a spatial variance measure for at least one macroblock of at least one frame of a stream of frames; selecting a prediction mode corresponding to a partition size of said at least one macroblock, said partition size being chosen at least partially in dependence on said spatial variance measure of said at least one macroblock; generating a prediction for said at least one macroblock using said prediction mode; and encoding said at least one macroblock at least partially in dependence on said prediction.

According to some but not necessarily all embodiments, there is provided: A method for video encoding comprising: generating spatial variance measures for respective macroblocks of a first frame of a stream of frames; generating spatial variance measures for respective macroblocks of a second frame of said stream of frames, said second frame being near said first frame in said stream of frames; assigning a frame type to said first frame depending at least partially on comparison of said spatial variance measures of said respective macroblocks of said first frame to said spatial variance measures of said respective macroblocks of said second frame; and encoding said first frame depending at least partially on said frame type.

According to some but not necessarily all embodiments, there is provided: A method for video encoding comprising: generating spatial variance measures for respective macroblocks of at least one frame of a stream of frames; generating varimasking parameters for said respective macroblocks depending at least partially on said spatial variance measures; and encoding said at least one frame such that a lossiness of said encoding depends at least partially on said varimasking parameters of said at least one frame, wherein said varimasking parameters can cause a shift in encoding parameters away from their default values.

According to some but not necessarily all embodiments, there is provided: A method for video encoding using Inter prediction comprising: generating a spatial variance measure for at least one macroblock of at least one frame of a stream of frames; first comparing said spatial variance measure for said macroblock to a first threshold; second comparing said spatial variance measure for said macroblock to a second threshold; generating an Inter prediction, according to the Inter mode of prediction, for said macroblock depending on at least one partition size, said at least one partition size depending at least partially on said first comparison and said second comparison; and encoding said macroblock depending at least partially on said Inter prediction.

According to some but not necessarily all embodiments, there is provided: A method of video encoding using Intra prediction comprising: generating a spatial variance measure for at least one macroblock of at least one frame of a stream of frames; comparing said spatial variance measure for said macroblock to a threshold; conditionally disabling a set of prediction modes for said macroblock depending at least partially on said comparison; generating an Intra prediction, according to the Intra mode of video prediction, for said macroblock using at least one of a set of remaining Intra prediction modes for said macroblock; and encoding said macroblock depending at least partially on said Intra prediction.

According to some but not necessarily all embodiments, there is provided: A method of video encoding comprising: generating spatial variance measures for respective macroblocks in at least one frame of a stream of frames; generating a spatial variance measure of said frame using said spatial variance measures for respective macroblocks; generating a lossiness modifier for said frame using at least a bit length limitation of said at least one frame, a size of said frame and said spatial variance measure of said frame; and encoding said frame with a degree of lossiness depending at least partially on said lossiness modifier.

According to some but not necessarily all embodiments, there is provided: A method for video encoding comprising: generating spatial variance measures for respective macroblocks in at least one frame of a stream of frames; generating a spatial variance measure of said frame using said variance measures; generating a Delta QP for a one of said respective macroblocks depending at least partially on a spatial variance measure of said one respective macroblock and said spatial variance measure of said frame; comparing said spatial variance measure of said one respective macroblock to a threshold; and encoding said one respective macroblock using a modified default rate of lossiness for said frame, said modification being an increase or decrease by Delta QP.

According to some but not necessarily all embodiments, there is provided: A method of video encoding comprising: generating a stream of frames from a visual content; generating at least one spatial variance measure of at least one frame of said stream of frames; generating an encoded bitstream by encoding said at least one frame of said stream of frames depending at least partially on said at least one spatial variance measure; transmitting said encoded bitstream over a communications channel to a decoder; generating a decoded stream of frames by decoding said encoded bitstream; and displaying said decoded stream of frames on a physical display device.

According to some but not necessarily all embodiments, there is provided: A method for video encoding comprising: generating partition-wise luminance variance measures for respective macroblocks of at least one frame of a stream of frames; transforming said respective macroblocks; and quantizing said respective macroblocks depending at least partially on said partition-wise luminance variance measures of said respective macroblocks.

According to some but not necessarily all embodiments, there is provided: A method for video encoding comprising: choosing a prediction mode for at least one frame of a stream of frames; generating a set of predictions of values for macroblocks of said frame, said predictions depending at least partially on at least respective macroblocks and said prediction mode; subtracting said predictions from said respective macroblocks to produce residual macroblocks; transforming said residual macroblocks; and quantizing said residual macroblocks depending at least partially on an average of luminance variance measures for macroblocks of said frame and a percentage of macroblocks of said frame having luminance variance measures near zero.

According to some but not necessarily all embodiments, there is provided: A computer-readable medium having stored thereon instructions that, when executed, direct a computing apparatus to: generate at least one spatial variance measure across groups of pixels of at least one frame of a stream of frames; and encode said one frame variably, in dependence on said spatial variance measure; whereby computational load is reduced for ones of said frames which have smaller amounts of spatial variance.

According to some but not necessarily all embodiments, there is provided: A video system comprising: a computing apparatus that is configured to: generate at least one spatial variance measure across groups of pixels of at least one frame of a stream of frames; and encode said one frame variably, in dependence on said spatial variance measure; whereby computational load is reduced for ones of said frames which have smaller amounts of spatial variance.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

For different applications a variance measure can be generated locally within a frame, frame-wide or as a comparison between localities or entireties of different frames. Embodiments include, but are not limited to, applications to fine-tuning rate control on the macroblock level, frame-wide rate control, early prediction mode decisions, efficient macroblock partitioning and scene change prediction.

In various other embodiments, any of the inventive systems or methods described herein can be applied to an I-frame, P-frame or B-frame.

In various other embodiments, groups of samples are non-rectangular contiguous arrays of samples and patches of samples are subsets of said non-rectangular contiguous arrays of samples, the steps for generating a variance measure for such non-rectangular contiguous arrays of samples corresponding to the steps for generating a variance measure for P×Q groups of samples as described hereinabove.

In various other embodiments, a variance measure can be generated using chroma samples.

In various other embodiments, residual macroblocks or previously decoded and reconstructed macroblocks can be used to generate a variance measure.

In various other embodiments, encoder/decoder schemes other than AVC can be employed.

In various other embodiments, overlapping patches of a group can be used to generate a variance measure.

In various other embodiments, overlapping groups can be used to generate a variance measure.

In various other embodiments, a P×Q sized group of samples can be used instead of a macroblock to generate a variance measure.

In various other embodiments, an M×N patch of samples can be used instead of a 4×4 sub-block to generate a variance measure.

In various other embodiments, sizes P×Q other than 16×16 of groups of samples, including sizes where P does not equal Q, can be used to generate a variance measure.

In various other embodiments, sizes of patches of samples M×N other than 4×4, including sizes where M does not equal N, can be used to generate a variance measure.

In various other embodiments, samples in groups of samples can be non-contiguous.

In various other embodiments, samples in patches of samples can be non-contiguous.

In various other embodiments, a variance measure can be generated using the absolute differences between the square of a value and the square of the average over the M×N samples of that value.

In various other embodiments, the size P×Q of a group of samples can equal the size M×N of a patch of samples.

In various other embodiments, a reference frame can be non-consecutive to the currently encoding frame in the stream of frames.

In various other embodiments, a reference frame can be a later frame to the currently encoding frame in the stream of frames.

In various other embodiments, generating a variance measure can include additional layers between the group of samples level and the frame-wide level of averaging, taking absolute differences or normalizing.

In various other embodiments, a variance measure can be applied to predict local scene change.

In various other embodiments, numbers of regions other than 4 can be used to predict scene change.

In various other embodiments, overlapping regions can be used to predict scene change.

In various other embodiments, a reference frame that is near but not immediately prior to the currently encoding frame in the stream of frames can be used to predict scene change.

In various other embodiments various additional or alternative partition sizes can be used in Early Inter Partitioning Decision.

In various other embodiments additional threshold decision stages can be used in Early Inter Partitioning Decision.

In various other embodiments, the maximum and minimum ΔQP clamping values can be chosen to achieve a desired ratio of perceived visual quality to compression efficiency.

In various other embodiments, the varimasking parameters for a macroblock include $\delta$ and $V_{thr}$; that is, each macroblock in a frame may have a different $\delta$, and thus a different $V_{thr}$.

In various other embodiments, varimasking can be performed based on chroma complexity.

In various other embodiments of Bitrate Targeting, the chosen QP results in the frame being encoded using strictly fewer bits than a target number.

In various other embodiments of Bitrate Targeting, $\phi$ is initially set to a number other than 1.

In various other embodiments of NALU Packing, macroblocks loaded into an NALU are from more than one frame in the stream of frames.

In various other embodiments, frames are encoded in an order different from their order in the stream of frames.

Additional general background, which helps to show variations and implementations, may be found in the following publications, all of which are hereby incorporated by reference: I. Richardson, The H.264 Advanced Video Compression Standard (2.ed. 2010), which is hereby incorporated by reference, together with all references cited therein, and the AVC standard itself, including all in-force and superseded components thereof. In-force and superseded components of the AVC standard may be found at http://www.itu.int/rec/T-REC-H.264 (Oct. 5, 2011).

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method of video encoding, comprising:
    generating at least one spatial variance measure across groups of pixels of at least one frame of a stream of frames;
    encoding said one frame variably, in dependence on said spatial variance measure;
    generating a prediction of values of a one of said groups of pixels using a prediction mode selected from one of Inter-mode prediction and Intra-mode prediction;
    encoding said one group of pixels at least partially in dependence on said prediction, wherein said selected prediction mode is at least partially dependent on a spatial variance measure for said one group of pixels;

generating a bit budget for said one of said groups of pixels based on said spatial variance measure; and loading said one of said groups of pixels and a plurality of previous groups of pixels into a Network Abstraction Layer Unit (NALU) until a sum of respective bit budgets for: said one of said groups of pixels, said plurality of previous groups of pixels, and a subsequent group of pixels is greater than a number of bits available in a payload of said NALU.

2. The method of video encoding of claim 1, further comprising:

in a first step, finding an average of values of pixels in a one patch of pixels in a one of said groups of pixels;

in a second step, for said one patch of pixels, creating a sum of absolute differences between said values of said pixels and said average of values;

in a third step, repeating said first step and second step for remaining ones of patches of pixels, if any, in said one group of pixels; and in a fourth step, averaging said sums of absolute differences of said one patch of pixels and said remaining patches of pixels, if any, wherein said one patch of pixels and said remaining ones of patches of pixels, if any, are subsets of said one group of pixels, and wherein said spatial variance measure for said one group of pixels is generated using said first step, said second step, said third step, and said fourth step.

3. The method of video encoding of claim 2, wherein said patches of pixels comprise M×N sized arrays of pixels.

4. The method of video encoding of claim 2, wherein said patches of pixels comprise 4×4 sized arrays of pixels.

5. The method of video encoding of claim 1, wherein said at least one spatial variance measure across groups of pixels is generated from luma values of said pixels.

6. The method of video encoding of claim 1, wherein said at least one spatial variance measure across groups of pixels is generated from chroma values of said pixels.

7. The method of video encoding of claim 1, further comprising:

excluding a set of prediction modes corresponding to at least one partition size of a one of said groups of pixels depending at least partially on a spatial variance measure for said one group of pixels;

selecting a non-excluded prediction mode;

generating a prediction of values of said one group of pixels at least partially in dependence on said selected prediction mode; and encoding said one group of pixels at least partially in dependence on said prediction.

8. The method of video encoding of claim 1, further comprising:

determining a default prediction mode for said frame depending at least partially on a spatial variance measure of said frame;

signaling said default prediction mode to at least one of a mode select stage and a rate control stage of an encoder; and encoding said frame at least partially in dependence on said default prediction mode.

9. The method of video encoding of claim 1, further comprising:

selecting a rule from a predetermined list of rules for a one of said groups of samples of said frame, rules of said predetermined list of rules defining how to generate a new group of samples from samples near said one group of samples in at least one of said frame and a reference frame in said stream of frames, said rule being selected to generate said new group of samples by determining a similarity between the new group of samples to said one group of samples, said selected rule being selected at least partially in dependence on a spatial variance measure of said one group of samples; and encoding said one group of samples at least partially in dependence on said selected rule, wherein a sample comprises a single color plane of information of a pixel.

10. The method of video encoding of claim 9, wherein whether said selected rule defines generation of a new group of samples from samples near said one group of samples in said frame or in said reference frame in said stream of frames is at least partially dependent on said spatial variance measure of said one group of samples.

11. The method of video encoding of claim 10, wherein rules are removed from said predetermined list of rules prior to selection of said selected rule at least partially in dependence on said spatial variance measure of said one group of samples, and wherein said removed rules correspond to at least one partition size of said one group of samples.

12. The method of video encoding of claim 1, further comprising:

selecting a rule from a predetermined list of rules, rules of said predetermined list of rules defining how to generate a new group of samples from samples near a one of said groups of samples in at least one of said frame and a reference frame in said stream of frames;

signaling said selected rule as a default prediction mode for said frame to at least one of a mode select stage and a rate control stage of an encoder; and encoding said frame at least partially in dependence on said default prediction mode;

wherein said selected rule is selected at least partially in dependence on a spatial variance measure of said frame, and wherein a sample comprises a single color plane of information of a pixel.

13. The method of video encoding of claim 1, further comprising:

modifying a default rate of lossiness of compression for at least one of said groups of pixels at least partially in dependence on a respective spatial variance measure; and encoding said group of pixels at least partially in dependence on said modified rate of lossiness of compression.

14. The method of video encoding of claim 1, wherein said groups of pixels comprise P×Q sized arrays of pixels.

15. A computing apparatus comprising:

a memory; and a processor, said processor capable of executing instructions stored in said memory, said instructions comprising:

generating spatial variance measures for respective macroblocks of at least one frame of a stream of frames;

generating an amount of bitwise right-shift of said frame;

encoding said frame such that the lossiness of said encoding is at least partially dependent on said spatial variance measure and the amount of bitwise right-shift, to thereby generate an encoded data stream which generally corresponds to said frame;

generating a bit budget for said at least one macroblock of said respective macroblocks at least partially in dependence of said spatial variance measure for said at least one macroblock; and loading said at least one macroblock and a plurality of previous said respective macroblocks into a Network Abstraction Layer Unit (NALU) until a sum of respective bit budgets for: said at least one macroblock, said plurality of previous macroblocks, and a subsequent macroblock of said respective macroblocks is greater than a number of bits available in a payload of said NALU; and transmitting said encoded data stream, whereby said encoded data stream can be decoded at a receiving device to generate a recovered stream which generally corresponds to said frame.

16. The computing apparatus of claim 15, wherein a spatial variance measure for a one of said respective macroblocks is generated at a level of resolution corresponding to a partition of said one respective macroblock.

17. The computing apparatus of claim 15, wherein a spatial variance measure for a one of said respective macroblocks is generated from luma values of said one respective macroblock.

18. A method for video encoding comprising:

generating a spatial variance measure for at least one macroblock of at least one frame of a stream of frames;

choosing a prediction mode at least partially in dependence on said spatial variance measure of said at least one macroblock, wherein at least one prediction mode of a set of enabled prediction modes is disabled based on the spatial variance measure;

generating a prediction of values for said at least one macroblock, using said prediction mode;

encoding said at least one macroblock at least partially in dependence on said prediction;

generating a bit budget for said at least one macroblock at least partially in dependence of said spatial variance measure; and loading said at least one macroblock and a plurality of previous macroblocks into a Network Abstraction Layer Unit (NALU) until a sum of respective bit budgets for: said at least one macroblock, said plurality of previous macroblocks, and a subsequent macroblock is greater than a number of bits available in a payload of said NALU.

19. The method for video encoding of claim 18, wherein said variance measure is generated as a combination of properties separately determined for partition-sized subsets of said at least one macroblock.

* * * * *